United States Patent Office 3,271,769
Patented Sept. 6, 1966

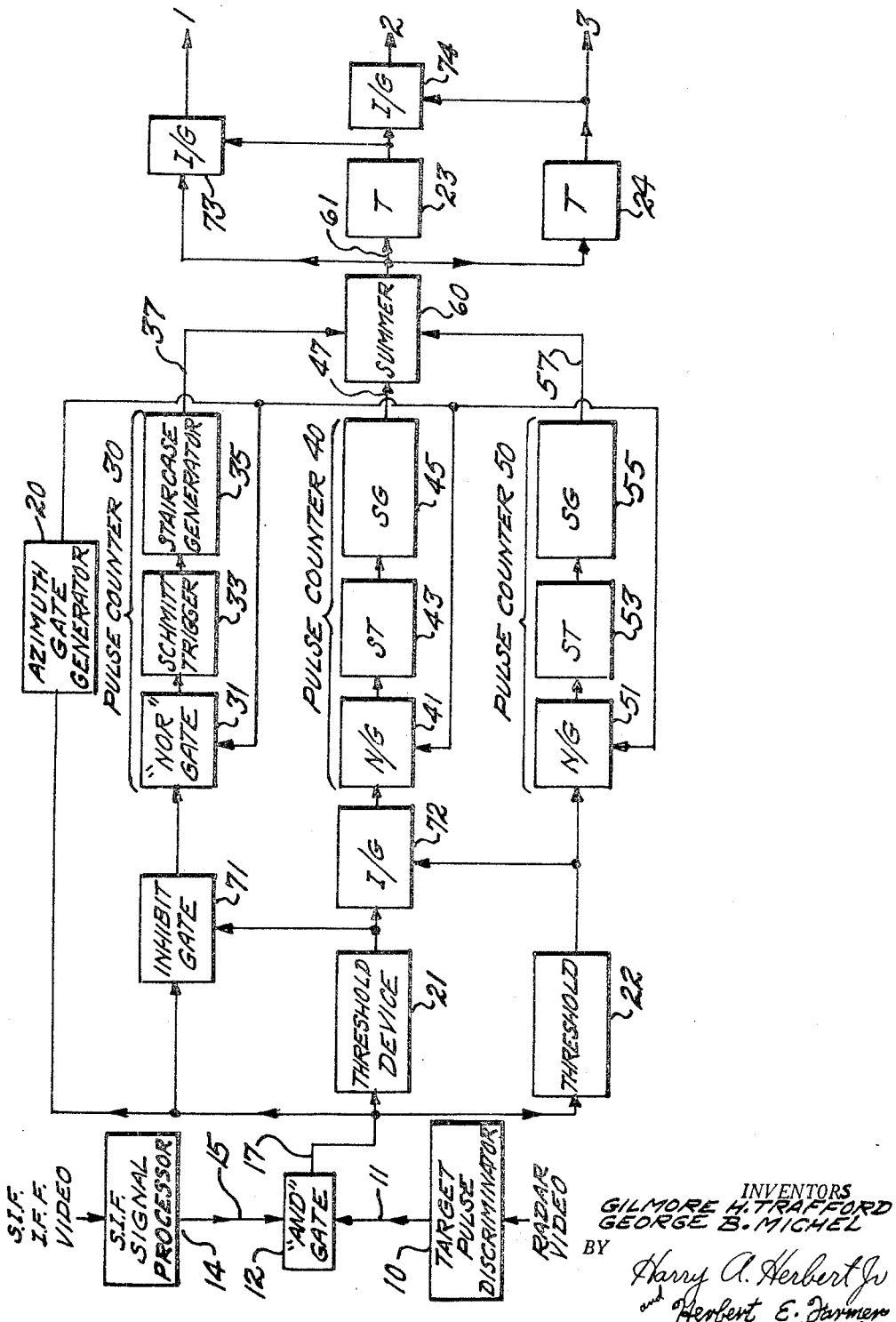

3,271,769
RADAR VIDEO PULSE TO PULSE WEIGHTING APPARATUS
Gilmore H. Trafford, Lexington, Mass., and George B. Michel, Baltimore, Md., assignors, by mesne assignments, to the United States of America as represented by the Secretary of the Air Force
Filed Jan. 14, 1965, Ser. No. 425,647
3 Claims. (Cl. 343—17.1)

This invention relates to radar object locating systems of the scanning type, and more particularly, to means for automatically weighting flight test target echo pulses returning to a radar system over the time that the target is in the main beam of the radar receiving antenna.

This invention has utility in evaluating range coverage data obtained during flight. Previously, the prior art method of obtaining the data required to predict a radar system's range coverage was to estimate the number of echo pulses returned per antenna beamwidth by assigning a rating of strong, medium, weak, or miss to each consecutive target blip that is displayed on a plan position indicator (PPI) or "A" scope.

Accordingly, an object of the instant invention is to provide radar video processor apparatus which will automatically determine the strength rating of each target blip received. To the accomplishment of the aforementioned and additional objects, the instant invention comprehends weighting each target pulse echo on the basis of its signal level, and then summing these pulses to produce a voltage resultant. This voltage resultant is then subject to several threshold levels which are predetermined for the particular radar system being utilized. The output is digitalized blip strength data which is fed into a punched tape or punched card processor.

Other features and objects of this invention and the manner of obtaining them will become more apparent by reference to the following description taken in connection with the accompanying single figure, on the drawing which is a schematic block diagram of a radar video processor with pulse to pulse weighting in accordance with one embodiment of the present invention.

Referring now to the figure, video from the radar receiver (not shown) is fed into the radar video processor via target pulse discriminator 10, which can be either a pulse width or pulse amplitude discriminator having sensitivity time control. Target selectivity is accomplished by the use of "And" Gate 12 which only passes information 17 when SIF (IFF Selective Identification Feature) video information 15 from SIF signal processor 14 is range and azimuth coincident with target pulse discriminator output 11. Output 17 from "And" gate 12 is fed into three separate pulse counters, 30, 40 and 50, and to azimuth gate generator 20. It is to be noted that pulse counter 30 is fed directly while pulse counters 40 and 50 are fed via set threshold devices 21 and 22. Azimuth gate generator 20 produces a gate whose width is preset and is determined by the azimuth scan rate and radar antenna beamwidth in accordance with the relation, $$\tau = \frac{\theta_B}{360} \times \frac{60}{\omega} \text{ (sec.)}$$

where $\tau$ is the gate width in seconds, $\theta_B$ is the horizontal beamwidth in degrees, and $\omega$ is the rotatonal speed of the antenna. During an interval of time determined by Azimuth gate generator 20, each pulse counter passes information that appears at the input to its respective "NOR" Gate, 31, 41 or 51, through the "Nor" Gate to its respective Schmitt Trigger (ST), 33, 43 or 53, and then to its respective staircase generator (SG), 35, 45 or 55. Each of the staircase generators produces voltage steps that are directly related to the number of target echo pulses that are received over the antenna beamwidth. The separation of the target returns into three amplitude levels at the output of "And" Gate 12 allows weighting to be applied on a pulse to pulse basis. Weighting is achieved by adjusting the heights of the voltage steps generated by staircase generator 34, 45 and 55. After weighting, outputs 37, 47 and 57 of the pulse counters are fed, at a time corresponding to the end of the azimuth gate, into Summer 60. After summation, resultant "Summer" output voltage 61 is passed through two more threshold devices 23 and 24 which reclassify the output into the resired three grades of blip strength, strong, medium or weak. It is to be noted that Inhibit Gates 71–74 are used to prevent echo pulses of higher signal levels from being counted by lower signal level counters, and to prevent higher level blip strength information from actuating lower level circuits.

While there has been shown what is at present considered to be a preferred embodiment of the invention, it will be obvious that many changes and modifications may be made therein without departing from the essential scope of the invention. It is intended therefore in the accompanying claims to cover such changes and modifications as fall within the true spirit of the invention.

What we claim is:

1. In scanning radar system comprising an antenna and receiver for receiving echo pulses from a target, means for automatically segregating each of said received echo pulses into one of three predetermined grades of signal levels comprising: pulse discriminator means connected to the output of said receiver, target selectivity gate means to which the output from said pulse discriminator means is applied, range and azimuth signal processor means associated with said scanning radar system having an output connected to said target selectivity gate means, said gate means being enabled only when said pulse discriminator output and said signal processor output are simultaneously energized, first, second and third pulse counter means to which the output from said gate means is applied, azimuth gate generator means to which the output from said gate means is applied, said azimuth gate having a width determined by the azimuth scan rate and antenna beamwidth of said scanning radar system, means electrically interposed between the input of each of said pulse counter means and the output of said target selectivity gate means to separate each target pulse return into three different amplitude levels, each of said pulse counters comprising adjustable voltage step generating means for weighting each of said target echo pulses on a pulse to pulse basis over the antenna beamwidth, each of said voltage step generating means having a different signal amplitude from the other, voltage summing means to which the output from each of said pulse counter means is connected, and pulse signal classifying means connected to the output of said summing means comprising first and second threshold means connected in parallel to segregate said summing means output into one of three predetermined output levels.

2. The apparatus as described in claim 1 wherein said means electrically interposed between each of said pulse counter means and said target selectivity gate means comprises a first inhibit gate connected in series with said first pulse counter, a first threshold device and a second inhibit gate connected in series with said second counter, and a second threshold device connected in series with said third pulse counter means.

3. The apparatus as described in claim 1 wherein said pulse signal classifying means comprises a first, second and third circuit connected to the output of said voltage summing means, said first circuit including a third inhibit gate, said second circuit including a third threshold device and a fourth inhibit gate serially connected and said third circuit including a fourth threshold device.

No references cited.

CHESTER L. JUSTUS, *Primary Examiner.*

RODNEY D. BENNETT, *Examiner.*